United States Patent
Mau et al.

(10) Patent No.: US 9,514,332 B2
(45) Date of Patent: Dec. 6, 2016

(54) NOTIFICATION AND PRIVACY MANAGEMENT OF ONLINE PHOTOS AND VIDEOS

(71) Applicant: SEE-OUT PTY LTD., Toowong (AU)

(72) Inventors: Sandra Mau, Toowong (AU); Abbas Bigdeli, Toowong (AU)

(*) Notice: Subject to any disclaimer, the term of this patent is extended or adjusted under 35 U.S.C. 154(b) by 0 days.

(21) Appl. No.: 14/376,580

(22) PCT Filed: Feb. 1, 2013

(86) PCT No.: PCT/IB2013/000578
§ 371 (c)(1),
(2) Date: Aug. 4, 2014

(87) PCT Pub. No.: WO2013/114212
PCT Pub. Date: Aug. 8, 2013

(65) Prior Publication Data
US 2015/0033362 A1    Jan. 29, 2015

Related U.S. Application Data (60) Provisional application No. 61/594,948, filed on Feb. 3, 2012.

(51) Int. Cl.
*G06F 15/173* (2006.01)
*G06F 21/62* (2013.01)
(Continued)

(52) U.S. Cl.
CPC ..... *G06F 21/6245* (2013.01); *G06F 17/30268* (2013.01); *G06F 17/30598* (2013.01);
(Continued)

(58) Field of Classification Search
CPC ................................. G06F 21/6245
(Continued)

(56) References Cited

U.S. PATENT DOCUMENTS

2008/0260239 A1* 10/2008 Han ................. G06K 9/00248
382/156
2009/0324022 A1* 12/2009 Sangberg .......... G06F 17/30265
382/118
(Continued)

FOREIGN PATENT DOCUMENTS

| EP | 2557524 A1 | 2/2013 |
|---|---|---|
| WO | 2012061824 A1 | 5/2012 |

OTHER PUBLICATIONS

The International Search Report and Written Opinion From Corresponding Application PCT/IB2013/000578, Mailed Aug. 5, 2013 (11 Sheets).

*Primary Examiner* — Peter Shaw
(74) *Attorney, Agent, or Firm* — King & Spalding LLP (57) ABSTRACT

Systems and methods for notification and privacy management of online photos and videos are herein disclosed. According to one embodiment, a computer-implemented method includes detecting a first feature from a first image belonging to an image source. The first image includes a tag. The computer-implemented method further includes determining a first feature location of the first feature, determining a first tag location of the tag, extracting a first feature signature from the first feature based on a relationship between the first feature location and the first tag location, detecting a second feature from a second image belonging to the image source, extracting a second feature signature from the second feature, performing a first comparison between the first feature signature and the second feature signature, and deriving a first similarity score based on a result of the first comparison.

25 Claims, 8 Drawing Sheets

(51) Int. Cl.
 *G06K 9/00* (2006.01)
 *G06F 17/30* (2006.01)
 *G06N 99/00* (2010.01)

(52) U.S. Cl.
 CPC ..... *G06K 9/00288* (2013.01); *G06K 9/00677* (2013.01); *G06N 99/005* (2013.01)

(58) Field of Classification Search
 USPC .......................................................... 726/27
 See application file for complete search history.

(56) References Cited

U.S. PATENT DOCUMENTS

| | | | |
|---|---|---|---|
| 2010/0322522 A1* | 12/2010 | Wang .................. | G06K 9/6211 382/218 |
| 2011/0078097 A1* | 3/2011 | Thornton .......... | G06F 17/30265 706/12 |
| 2011/0123071 A1* | 5/2011 | Shah .................. | G06K 9/00288 382/118 |
| 2011/0211737 A1* | 9/2011 | Krupka ............. | G06F 17/30247 382/118 |
| 2012/0087548 A1 | 4/2012 | Wu et al. | |
| 2012/0141017 A1* | 6/2012 | Krupka ............. | G06K 9/00228 382/159 |
| 2012/0158700 A1* | 6/2012 | Dodson ............. | G06K 9/00288 707/722 |
| 2012/0158721 A1 | 6/2012 | Hua et al. | |

\* cited by examiner

NOTIFICATION AND PRIVACY MANAGEMENT OF ONLINE PHOTOS AND VIDEOS

The present application claims the benefit and priority to U.S. Provisional Application Ser. No. 61/594,948, entitled "Notification and Privacy Management of Online Photos and Videos", filed on Feb. 3, 2012, and is hereby incorporated by reference.

FIELD OF TECHNOLOGY

The present application relates in general to systems and methods of notification and privacy management of online photos and videos. In particular, the present application is directed to systems and methods of using image processing for online privacy.

BACKGROUND

There are many online services that offer users to connect to other users and share information including media such as photos and videos. These services are commonly referred to as social network services. Several social network services (e.g., FACEBOOK®, FLICKR®, and GOOGLE+®) and third-party web services (e.g., FACE.COM®'s FACE-BOOK® application) provide semi-automated user interfaces for users to apply a tag or annotation to a face in an image and link the face with a corresponding user's account. For example, a tag or annotation is a location marker that denotes a landmark in an image. A user face tag may be a rectangle or a point on the image that denotes the location of a person's face. Systems and processes that provide automated face tagging or annotation using face recognition have been described in U.S. Pat. Pub. No. US2010/0063961 by Guiheneuf, et al. (hereinafter "Guiheneuf") entitled "Reverse Tagging of Images in System for Managing and Sharing Digital Images".

Automatic facial recognition is a particular application in the field of computer vision and image processing. It involves comparing two faces and generating a match or similarity score (or distance score) that is a measure of how similar the two faces are to each other. A threshold based on the similarity score is used to classify whether the two faces belong to the same person, or two different people. The process of face recognition involves extraction of one or more types of low-level image features, deriving one or more high level representations of the two faces based on pre-trained models, and comparing the high level representations of the two faces to each other to derive the distance or similarity between them using some metric. A survey of face recognition methods has been described by Zhao, et al. (Zhao et al., "Face Recognition: A Literature Survey", ACM Comput. Surv. 35, pp. 399-458, Dec. 4, 2003) (hereinafter "Zhao").

While several software and social network services currently offer tools that use face recognition for automated suggestions for tagging faces in images, these tags and tools are optional. If tags are not added to these images, the faces of corresponding users are not easily found again. Moreover, tags are only offered to the creator who create or uploads a photo, photo album or video, and not to the user whose face is contained within the photo. Therefore, users are reliant on their friends or connections to inform them of these uploaded photos directly or by applying the annotation tool. When the creator uses the annotation tool to tag the face in an image to a second user, the social network service notifies the second user of the new image posted. If the tag is not added to the image by the creator, the second user may be unaware of this new image of them online. This is a major concern for many users of social network services, as they are not in control of their online image footprint, and may be unaware of their related information being shared with the world.

SUMMARY

Systems and methods for notification and privacy management of online photos and videos are herein disclosed. According to one embodiment, a computer-implemented method includes detecting a first feature from a first image belonging to an image source. The first image includes a tag. The computer-implemented method further includes determining a first feature location of the first feature, determining a first tag location of the tag, extracting a first feature signature from the first feature based on a relationship between the first feature location and the first tag location, detecting a second feature from a second image belonging to the image source, extracting a second feature signature from the second feature, performing a first comparison between the first feature signature and the second feature signature, and deriving a first similarity score based on a result of the first comparison.

The above and other preferred features, including various novel details of implementation and combination of events, will now be more particularly described with reference to the accompanying figures and pointed out in the claims. It will be understood that the particular methods described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying figures, which are included as part of the present specification, illustrate the presently preferred embodiments of the present invention and together with the general description given above and the detailed description of the preferred embodiments given below serve to explain and teach the principles of the present invention.

DETAILED DESCRIPTION

Systems and methods for notification and privacy management of online photos and videos are herein disclosed. According to one embodiment, a computer-implemented method includes detecting a first feature from a first image belonging to an image source. The first image includes a tag. The computer-implemented method further includes determining a first feature location of the first feature, determining a first tag location of the tag, extracting a first feature signature from the first feature based on a relationship between the first feature location and the first tag location, detecting a second feature from a second image belonging to the image source, extracting a second feature signature from the second feature, performing a first comparison between the first feature signature and the second feature signature, and deriving a first similarity score based on a result of the first comparison.

The present disclosure describes a system and method of providing an automated tool or service that uses face recognition to scan media (e.g., photos and videos) uploaded online from a user and a user's connections, and to notify the user if his face is recognized in any of the uploaded media, according to one embodiment. Existing tagged images of the user are used as reference for face recognition. The tags used for the tagged images may be in the form of labels, tag and annotations. The present disclosure relates to the use of image processing for online privacy.

Figure 1:
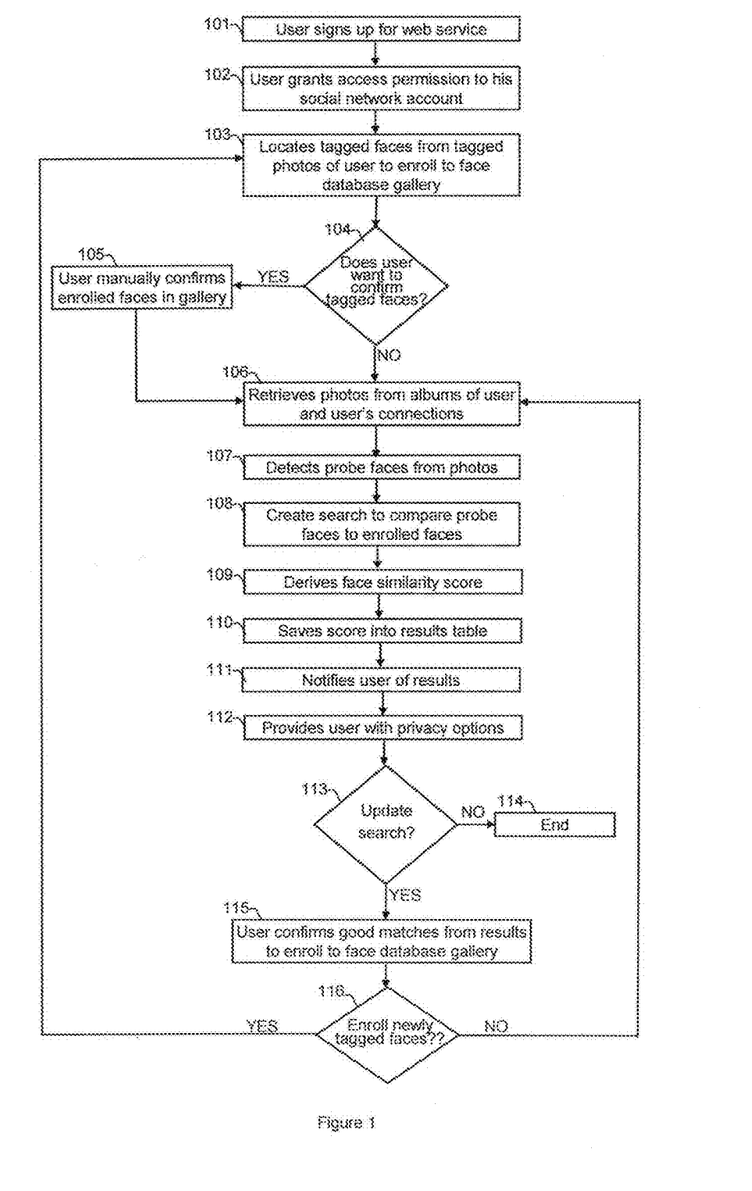
FIG. 1 illustrates an exemplary flow chart for notification and privacy management of online photos and videos using the present system, according to one embodiment.

FIG. 1 illustrates an exemplary flow chart for notification and privacy management of online photos and videos using the present system, according to one embodiment. A user signs up for a web service of the present system that provides sharing of photos and videos at 101. The user grants the web service a permission to access his or her social network account and connections related to the user at 102. At 103, the system locates tagged faces from tagged photos of the user and enrolls the tagged faces to a face database gallery. The system provides the user with an option to confirm the enrolled faces at 104. The user may choose to manually confirm the enrolled faces in the face database gallery at 105.

The system retrieves photos from the albums belonging to the user and the user's connections at 106. The system detects faces in the retrieved photos at 107. These detected faces are referred to as probe faces. The system may use a variety of face detection techniques which occurs to one ordinary skilled in the art. The process of detecting probe faces from a photo is described in further detail below. The system creates a search to compare the probe faces to the enrolled faces in the face database gallery at 108. According to one embodiment, the system compares the probe faces to the enrolled faces using face recognition. The system derives a face similarity score at 109 and saves this similarity score into one or more result tables at 110. At 111, the system notifies the user of the results. According to one embodiment, the user may view the results of the images with probe faces that have been identified as being similar to the tagged faces enrolled in the face database gallery. At 112, the system provides the user with a variety of privacy options to the images with probe faces that have been identified as being similar to the tagged faces enrolled in the face database gallery. According to one embodiment, the user may add or remove face tags to the probe faces, send messages to the owner of the image, and notify the social network service of an improper use. According to another embodiment, the user may select photo organization and sharing options including saving the photos (with probe faces that have been identified as similar to the enrolled tagged faces) in an online album and sharing the online album with friends. According to another embodiment, the user may view the enrolled faces from the face database gallery and choose to use only a subset of the enrolled faces for the search or delete some or all the enrolled faces from the face database gallery.

The system provides the user with an option of updating the search at 113. According to one embodiment, the search update is defined by the system by scheduling the update on a timer or a queue or based on callback on changes to the social network feeds for the user. If the search is not updated, the process ends at 114. The user can also manually choose to update the search. If there is a user in the loop for the update, the user is asked to confirm the probe faces that have been identified as good matches from the results and enrolls these probe faces to the face database gallery at 115. The system provides the user with an option of enrolling newly tagged photos to the face database gallery at 116. According to one embodiment, enrolling newly tagged photos to the face database gallery may be triggered by the user via the user interface or by the system periodically or on every search update. If newly tagged faces are enrolled to the face database gallery, the process repeats to 103 of locating tagged faces from tagged photos of the user to enroll to the face database gallery. If no newly tagged faces are enrolled to the face database gallery, updating the search repeats the process to 106 to retrieve photos from the albums belonging to the user and the user's connections.

The present system performs automatic face detection to detect probe faces in an image, according to one embodiment. The system scans an image to detect whether one or more faces appear in that image. If a face is found, it returns the location of that face within the image. Many approaches for face detection have been outlined, for example, by Zhang, et al. (Zhang et al., "A Survey of Recent Advances in Face Detection", Technical Report MSR-TR-2010-66, Microsoft Research, Microsoft Corporation, June 2010) (hereinafter "Zhang").

According to one embodiment, the present system utilizes the Viola-Jones face detector that runs in real-time as described by Viola, et al. (Viola et al., "Rapid Object Detection Using Aboosted Cascade of Simple Features", Proc. CVPR 2001) (hereinafter "Viola"). The Viola-Jones face detector combines three elements. Firstly, it transforms an image into another representation known as an integral image that allows the features to be computed quickly at different scales. Secondly, a learning algorithm based on adaptive boosting (i.e., AdaBoost) selects a small number of critical visual features for its face classifiers. Thirdly, the face classifiers are combined in a cascade that quickly discard un-face-like regions of the image while spending more computation on more likely face-like regions.

The Viola-Jones face detector uses rectangular Haar-like features that are calculated by taking the intensity difference between adjacent rectangles. The integral image, also known as a summed area table, is a table of summed values at each pixel's (x, y) location within the rectangle that is above and to the left of that pixel. Based on the integral image, any rectangular sum may be computed in four array references, and the difference between two rectangular sums (e.g., a 2-rectangular Haar feature) is computed in eight references. This results in many features. According to one embodiment, in a 24×24 pixel sub-window, there are a total of 45,396 possible features, and it would be prohibitively expensive to evaluate all of these features. Therefore, the present system uses a learning method based on AdaBoost to both select the best features and to train classifiers that use them. The resulting classifiers are ordered in a cascade in order of complexity where each successive classifier is trained only on those samples that pass through the preceding classifiers. If a classifier rejects the sub-window at any stage in the cascade, no further processing is performed, and the system searches the subsequent sub-window.

Figure 2A:
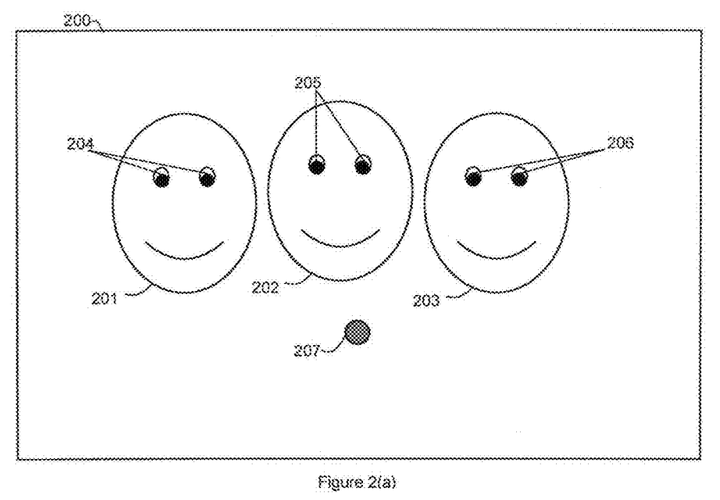
FIG. 2(a) illustrates an exemplary diagram of a tagged photo, according to one embodiment.
Figure 2B:
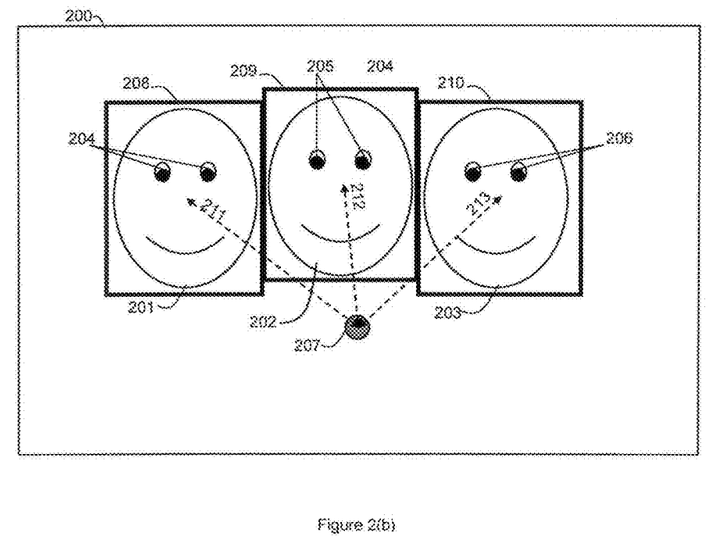
FIG. 2(b) illustrates an exemplary diagram of a tagged photo, according to one embodiment.

FIGS. 2(a) and 2(b) illustrate exemplary diagrams of a tagged photo, according to one embodiment. The system retrieves tagged photos from one or more image sources (e.g., social networks, sites with labeled photos, and uploads from a user). Referring to FIG. 2(a), the tagged photo 200 includes three faces 201, 202 and 203 and a tag 207. The tag 207 may be provided by a user whose face appears in the tagged photo 200 or the user's connection who provides the tagged photo 200. The system performs face detection on the tagged photo 200 and detects faces 201, 202 and 203. The system places boxes 208, 209 and 210 on each of the detected faces 201, 202 and 203. The system retrieves the location data of the tag 207 overlaid on the photo 200. According to one embodiment, the location data of the tag 207 may be a pair of x and y coordinates of a point or a box. The system further checks for locations of the pairs of eyes 204, 205 and 206. The system may estimate the locations of the eyes 204, 205 and 206 based on each of the respective face boxes 208, 209 and 210. The system also calculates the distance between each pair of eyes 204, 205 and 206.

According to one embodiment, the system determines which face the tag 207 is associated with among the three faces 201, 202 and 203. The system determines the lengths 211, 212 and 213 from the tag 207 to the center of each of the respective three faces 201, 202 and 203. The system then compares the three lengths 211, 212 and 213 and determines the face that the tag 207 is closest to. For example, in FIG. 2(b), face 202 is closest to the tag 207 as depicted by length 212. The system may further determine whether the tag 207 is sufficiently close to face 202 by comparing the length 212 between the tag 207 and the center of face 202 to a desired limit. According to one embodiment, the desired limit is determined on the condition that the length from the tag 207 to the center of the face 202 must be less than three times the length between the pair of eyes 205. If the length 212 between the tag 207 and the center of the face 202 is within the desired limit, the system determines that the tag 207 is close enough to face 202 and associates the face 202 with the tag 207.

According to one embodiment, the present system performs face recognition by generating face feature signatures. Several different approaches for face recognition have been reviewed by Zhao. One possible approach is based on a bag-of-words method. The bag-of-words method was derived from natural language processing where in the analysis of many documents, the order of the words is ignored. In computer vision, the bag-of-words method inspired a similar idea for image representation where the exact order or location of the extracted image features are not preserved.

According to one embodiment, the present system utilizes a probabilistic multi-region histogram approach for face recognition. An exemplary probabilistic multi-region histogram technique is described by Sanderson, et al. (Sanderson et al., "Multi-Region Probabilistic Histograms for Robust and Scalable Identity Interference", International Conference on Biometrics, Lecture Notes in Computer Science, Vol. 5558, pp. 198-208, 2009) (hereinafter "Sanderson"). The probabilistic multi-region histogram approach proposes that a face is divided into several large regions. According to one embodiment, a closely cropped face is divided into a 3×3 grid resulting in nine regions roughly corresponding to regions of eyes, forehead, nose, cheeks, mouth and jaw regions. Within each region, image features are extracted from smaller patches. Sanderson proposes a method for extracting discrete-cosine transform (DCT) features from 8×8 pixel patches and normalizing the coefficients, keeping only the lower frequency coefficients (the first 16) and discarding the first constant coefficient (resulting in 15 remaining coefficients). During training, a visual dictionary is built using a mixture of Gaussian's approach to cluster the extracted DCT features and generate likelihood models of visual word as expressed by each Gaussian cluster's principal Gaussian and associated probability distribution function. During evaluation, each extracted DCT feature is compared to the visual dictionary to calculate the posterior probability of the feature vector for every visual word in the visual dictionary. This results in a probabilistic histogram vector with a dimension equivalent to the number of Gaussians in the visual dictionary. The system generates a probabilistic histogram for each patch and averages them over each face region. The face feature signature is the concatenation of these regional histograms and is the image feature representative of a person's face in an image. Two faces may be compared to determine whether they represent the same person by comparing two face feature signatures using a distance/similarity metric. Sanderson proposes a method for calculating the L1-norm between the two signatures. The lower the distance, the more likely the two faces are representative of the same person.

Figure 3:
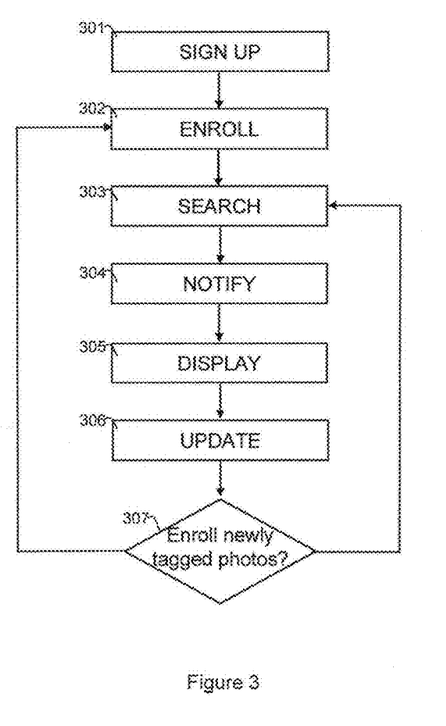
FIG. 3 illustrates an exemplary flow chart for notification and privacy management of online photos and videos using the present system, according to one embodiment.

FIG. 3 illustrates an exemplary flow chart for notification and privacy management of online photos and videos using the present system, according to one embodiment. At 301, the user signs up for a web service of the present system. At 302, the system enrolls tagged photos of the user into a face database gallery. At 303, the system creates a search to scan through photos that the user has access to (e.g., the user's albums and the user's friends' albums). The user's friends may control the photos on their albums that can be viewed and access by third party applications through their own privacy settings, The system uses faces from these photos (otherwise known as probe faces) to compare them against the faces enrolled in the face database gallery. At 304, the system provides a notification to the user when the search is complete. At 305, the system displays the images with probe faces identified as similar to the enrolled faces from the face database gallery. At 306, the system updates the search. The system provides an option of enrolling newly tagged photos at 307. If newly tagged photos are enrolled, the process repeats to enroll at 302. If no newly tagged photos are enrolled, the process repeats to search at 303. The present method for notification and privacy management is explained in further detail with reference to FIG. 4.

Figure 4:
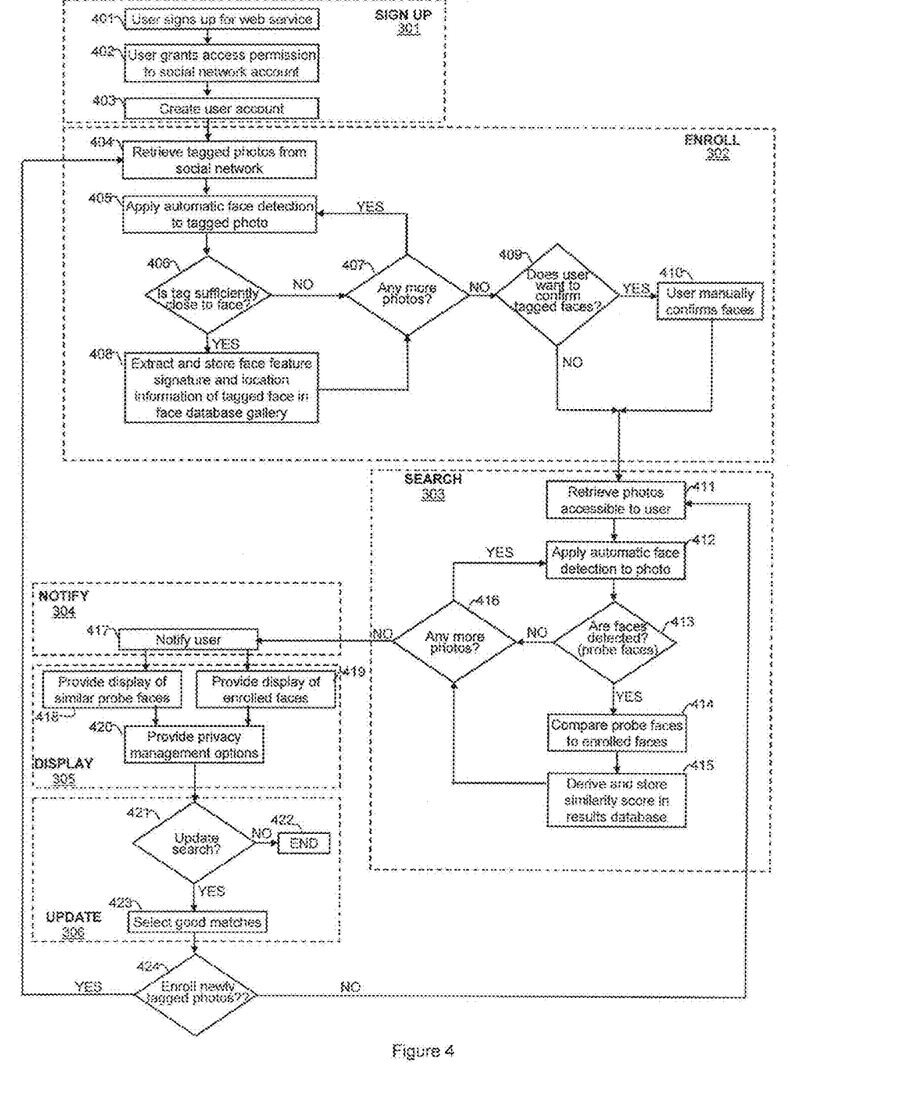
FIG. 4 illustrates a detailed exemplary flow chart for notification and privacy management of online photos and videos using the present system, according to one embodiment.

FIG. 4 illustrates a detailed exemplary flow chart for notification and privacy management of online photos and videos using the present system, according to one embodiment. Signing up 301 is represented by 401, 402 and 403. The user signs up for a web service of the present system at 401. At 402, the user grants the system an access permission to his or her social network account. According to one embodiment, with the user's consent, the system is granted an access token to scan through photos that the user has access. The access token may be repeatedly used for scanning newly updated photos. At 403, the system creates a user account for the user.

Enrolling 302 is represented by 404-410. The system retrieves tagged photos from the user's social network account at 404. According to one embodiment, the tagged photos are user accessible photos tagged with the user's ID, including photos from online albums belonging to the user and the user's connections. The system provides the user with an option of uploading the user's own new photos, according to one embodiment. At 405, the system applies automatic face detection to the tagged photos. The system detects faces in the tagged photo and determines the location of the detected faces. The location of the detected faces may be further used for display purposes. According to one embodiment, the system uses the Viola-Jones face detector that runs in real-time. The system may make use of other face detecting methods known to one skilled in the art. At 406, the system determines whether the tag is sufficiently close to the detected face. The tag may be sufficiently close to the detected face by overlapping the detected face or being close enough to the face or being the closest tag to the face (if multiple tags exist). If there are multiple faces in the photo, the system determines the face that the tag is associated with by comparing the length from the tag to the center of each of the faces and determining the closest length. The system may determine that the tag is sufficiently close to the face by comparing the length from the tag to the center of the face to a desired limit. According to one embodiment, the desired limit is that the length from the tag to the center of the face is less than three times the length between the eyes. The system may use other thresholds to determine that the tag is sufficiently close to the face. If the tag is not sufficiently close to the detected face, the system determines whether there are any more tagged photos to apply automatic face detection at 407.

The system extracts and stores a face feature signature and location information of the tagged face in the face database gallery at 408, if the tag is sufficiently close to the tagged face. The face feature signature may be a histogram signature based on the probabilistic multi-region histogram approach described by Sanderson, according to one embodiment. Extracting the face feature signature of the tagged face may include cropping the face, performing pre-processing steps (e.g., normalization, scaling, and filtering), extracting low level image features (e.g., patterns in the face). The system further converts the low level image features to a face feature signature by comparing the features to a dictionary of probabilistic models and generating a probabilistic histogram signature of the face. The system may further consolidate face feature signatures by clustering close signatures together and summarize the face feature signatures into one cluster by using a single representative signature. The system may use a K-means clustering approach or any other clustering approach known in the art. The system may further verify the face feature signature by comparing the face feature signature to existing signatures of a person and determining whether the match is close enough for acceptance. The system determines whether there are any more photos to apply automatic face detection at 407. If there are no more photos, the system provides the user with an option of confirming the tagged faces enrolled in the face database gallery at 409. The user may choose to manually validate and confirm the faces at 410. According to one embodiment, the system automatically proceeds to the search function 303 without providing the user with an option of confirming the tagged faces.

Once enrollment at 404-410 is complete, the system proceeds to the search function 303 that includes 411-416. The system retrieves photos accessible to the user through a social network site at 411. The system may retrieve photos, photo albums and videos from the user's albums and the user's connections' albums. According to one embodiment, the system may retrieve photos and videos from other sources, including online sources (e.g., websites, and blogs) and computer sources (e.g., the user's personal photo collection on his or her electronic device). At 412, the system applies automatic face detection to a photo from the user's albums or the user's connections' albums. According to one embodiment, the photos are retrieved from other photo sources including photos from other social network sites associated with the user, online websites, or images searches. The system determines if faces are detected in the photo at 413. The detected faces from the photos that the system has retrieved from the user's album or the user's friends' albums are known as probe faces. The system may further detect the location of these probe faces for display purposes. If probe faces are detected, these probe faces are compared to the enrolled faces at 414.

The system performs automatic face recognition by comparing the probe faces to the enrolled faces. The system extracts a probe face feature signature from each of the probe faces in a similar way of extracting a face feature signature from the tagged faces. The system then compares the probe face signature to each face feature signature of the enrolled tagged faces.

At 415, the system derives a similarity score between the probe face and each enrolled face and records the similarity score in a results database. According to one embodiment, the system compares the probe face to a representative enrolled face where the representative enrolled face is a mean histogram of all enrolled faces in the face database gallery.

Figure 5:
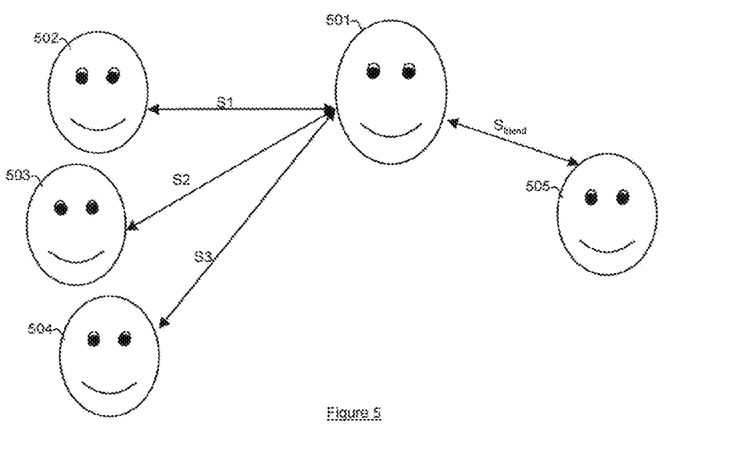
FIG. 5 illustrates an exemplary diagram for similarity scores between a probe face and enrolled faces, according to one embodiment.

FIG. 5 illustrates an exemplary diagram for similarity scores between a probe face and enrolled faces, according to one embodiment. S1 is the similarity score between probe face 501 and enrolled face 502. S2 is the similarity score between probe face 501 and enrolled face 503. S3 is the similarity score between probe face 501 and enrolled face 504. The system records the similarity scores S1, S2 and S3 along with the associated probe face 501 and the respective enrolled faces 502, 503 and 504 to a results database. The system may further compare the three similarity scores S1, S2 and S3 and record the lowest similarity score $S_{user}$ (i.e., the best match) along with the probe face and the closest matched enrolled face to a summary results table according to the equation:

$$S_{user} = \min(S1, S2, S3)$$

According to one embodiment, the system performs additional constraint checking to improve the results of the similarity score. As explained earlier, the system performs the search 303 using tagged faces of the user's face as a basis for comparison. The system then repeats the search by using tagged faces of the user's friends' faces in the social network as the basis for comparison. Referring to FIG. 5, the system measures the similarity score $S_{friend}$ between the probe face 501 and the tagged face 505 of the user's friend's face. The system compares the two similarity scores $S_{user}$, $S_{friend}$ and records the lower similarity score $S_{final}$ to the table of summary results according to the equation:

$$S_{final} = \min(S_{user}, S_{friend})$$

For example, if $S_{friend}$ is less than $S_{user}$, the system overwrites the results and records the similarity score $S_{friend}$ along with the probe face 501 and the tagged face 505 of the user's friend's face to the table of summary results. Since the identity of a face should typically occur only once in a photo (although masks or photo-editing software may alter this), the system records only the lowest similarity score $S_{final}$ or the closest match for each probe face to the results database. According to one embodiment, the system compares the lowest similarity score $S_{final}$ against a set threshold.

Referring to FIG. 4, the system determines whether there are more photos from the online albums of the user or user's friends at 416 and repeats the process from applying automatic face detection to each photo at 412.

When there are no more photos for the search 303, the system notifies the user at 304. Notification 304 includes 417. The system may further notify the user anytime during a search when there are relevant results to present to the user. According to one embodiment, the system may notify the user when the similarity scores are lower than a given threshold. The user may receive a notification through electronic means (e.g., through a built-in social network notification system, a visually changed icon on his social networking system, postings on the user's social network wall, and email).

After the system notifies the user at 417, the system performs the display at 305 which includes 418-420. The system provides a display of similar probe faces at 418 and displays enrolled faces at 419. The display of similar probe faces may include the probe faces that have better similarity scores (i.e., signifying a closer match) than the set threshold for the similarity scores in the results database. The display of similar probe faces visualizes the user to determine that images are properly tagged, untagged, or mistagged.

The system provides the user with privacy management options to manage the photos at 420. For example, the system provides privacy management options for the user through an interface, according to one embodiment. The system provides a visual display of tagged faces and matched photos (containing similar probe faces), face box overlays from existing tags and similar probe faces, and shows the enrolled face that is the closest match to each probe face. The system may also provide an option (e.g. a slider) to adjust the similarity threshold to update the results in real-time. According to one embodiment, this similarity threshold is stored as a user setting. The system provides options for the user to add new face tags to the probe faces, removes existing face tags, changes the privacy settings for user's own images, sends a message to the owner of the image (e.g., asking the owner to remove the image with the probe face), and requests to the social network site for the photo to be removed. For example, the user can report an abuse of a photo that contains their image without consent or permission to the social network site's "report a photo" option. The system may provide an option for the user to select certain enrolled faces from the face database gallery for comparison, and delete the enrolled faces from the face database gallery.

After the user views the display and selects the desired privacy management option(s) for the photos, the system executes an update 306. Update 306 includes 421-423. The system provides an option of updating the search at 421. The process ends at 422 if the user chooses not to update the search. If the search is updated, the system enrolls probe faces identified as good matches from the previous search into the face database gallery at 423. The system provides the user with an option of enrolling newly tagged images to the face database gallery at 424. This may be triggered by the user via the user interface, or periodically by the system, or on a new search update. If the user or the system chooses to enroll newly tagged images, the process repeats to the enrollment at 302, in particular to retrieve tagged photos from the social network at 404. According to one embodiment, the search update may include face recognition comparison results of the newly enrolled images against the previously observed probe faces. If the user or the system chooses not to enroll newly tagged images, the process repeats the search 303 from retrieving photos accessible to the user through the social network at 411. According to one embodiment, the mechanism for updating a search varies depending on the social network service's framework. For example, the update may be triggered via the social network service's website, scheduled by a timer, or queued or based on a callback on changes to the social network feeds for the user. Potential variations to the processes of face detection and face recognition include the methods of feature extraction, pre-processing and post-processing of the features and distances, using feature indexing for search, and these methods are well known in the art.

According to one embodiment, the user chooses to discontinue the use of the web service by disabling the user account and removing the user's associated data from the system as specified by the terms of service provided by the system.

According to one embodiment, the system trains a threshold for face recognition by training on an independent labeled data set. The independent labeled data set may include pairs of correctly matched images and pairs of incorrectly matched images since the identities of image faces in the labeled data set are known. The system may further add to the data set with system data by deriving labeled data from user feedback on whether the probe faces have been correctly or incorrectly matched (as illustrated at 115 in FIG. 1).

Figure 6:
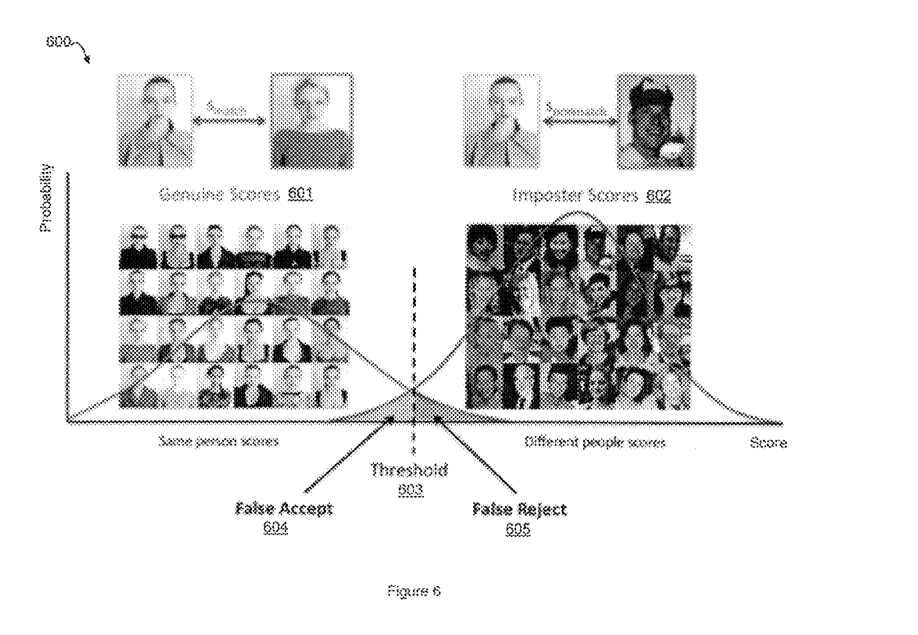
FIG. 6 illustrates an exemplary plot of the probability of similarity scores for correctly matched identities and incorrectly matched identities, according to one embodiment.

A threshold can be derived for a one-to-one verification system where a pair of faces is compared to determine whether they are the same identity. The system derives genuine similarity scores for each pair of correctly matched identities, and imposter scores for each pair of incorrectly matched identities. Referring to FIG. 6, the graph 600 shows a plot of genuine scores 601 and a plot of imposter scores 602 and an overlap region 603. The overlap region 603 is the threshold region that minimizes and/or balances two types of errors associated with thresholding and determines the similarity scores to accept a pair of faces as a correct match or incorrect match. One type of error is a false accept 604 that occurs from an incorrectly matched pair of identities, but is accepted as a match by the system. The second error is a false reject 605 that occurs when a correctly matched pair of identities is rejected by the system. The system balances these two types of errors to a desired operating characteristic by tuning the threshold 603.

According to one embodiment, the system employs a one-to-N identification where a probe face is compared to a list of N number of known reference identities to identify the probe face. The N number of known reference identities includes true/genuine identities as well as imposter identities. In a closed-set identification process, the probe face is definitely in the list of N number of reference identities. The system determines the similarity scores or match scores between the probe face and each of the known reference identities. The similarity scores are ranked and the highest rank (i.e., the best match between the probe face and a particular reference identity) is used. In an open-set identification process, the probe face may not be in the list of N number of reference identities. In this case, a combination of the highest rank and a threshold is used when each reference identity has more than one face available for comparison. Based on a labeled data set of known identities, the highest rank of similarity score belongs to a pair of correctly matched identities between the probe face and a true identity (i.e., true accept) or a pair of incorrectly matched identities between the probe face and an imposter identity (i.e., false accept).

Figure 7A:
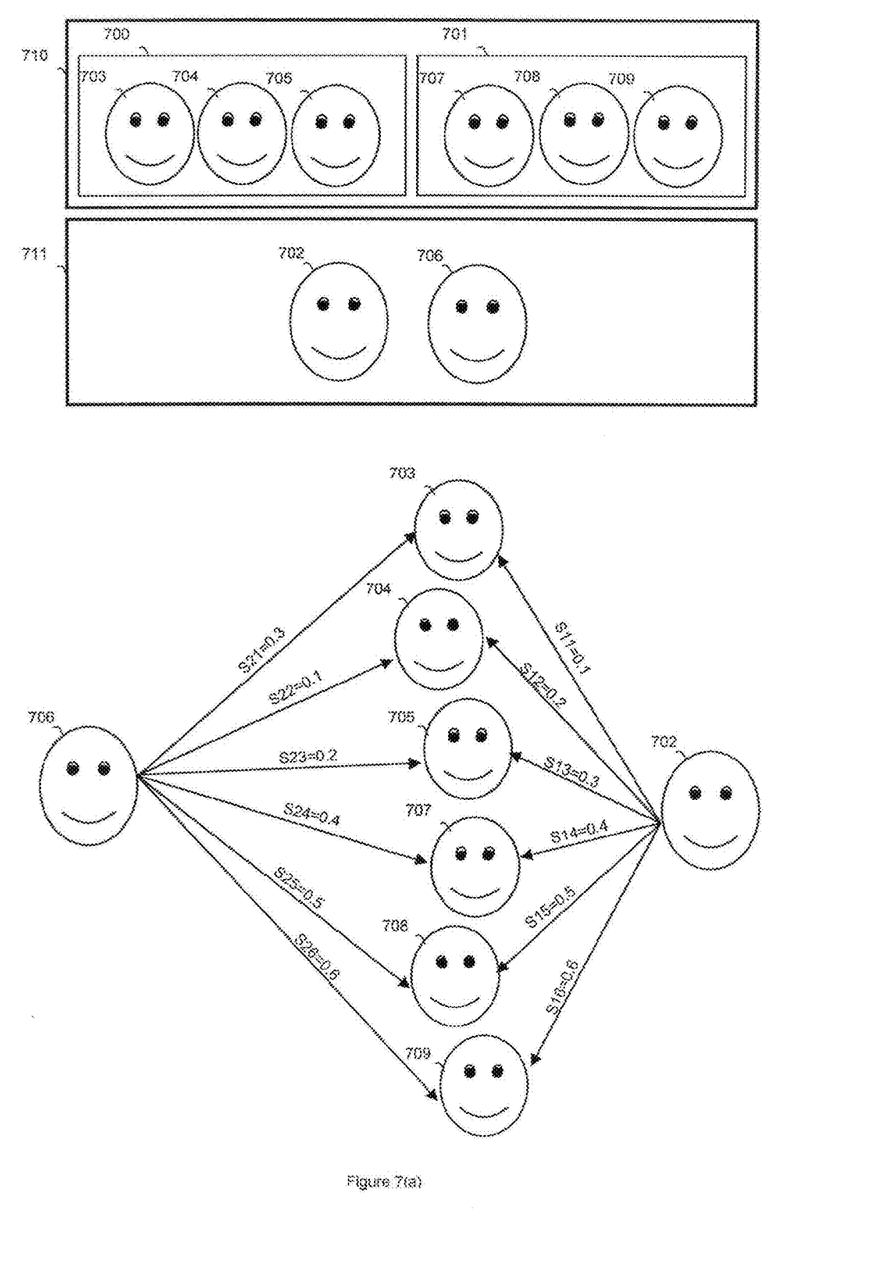
FIG. 7(a) illustrates an exemplary diagram of deriving a data set of highest ranked similarity scores for threshold training, according to one embodiment.

FIGS. 7(a)-7(b) illustrate exemplary diagrams of deriving a data set of highest ranked similarity scores for threshold training, according to one embodiment. A labeled dataset includes multiple face images associated with each identity. Referring to FIG. 7(a), the dataset is split into training sets 710 and test sets 711 where each identity has multiple face images in the training sets 710 and test sets 711. The faces in the training sets 710 and testing sets 711 are akin to enrolled faces and probe faces respectively. The threshold training function of the present system detects and extracts face feature signatures from a set of training faces in the training set 710 for each identity. The training set 710 includes training faces 703, 704 and 705 of Person X in Person X's face database gallery 700 and training faces 707, 708, 709 of Person Y in Person Y's face database gallery 701. The training photos may be tagged photos with tagged faces, faces with labels or photos with known identities of the faces. The system then retrieves test face 702 belonging to Person X from the test set and extracts a face feature signature of test face 702. The system compares the face feature signature of test face 702 against all training faces 703, 704, 705, 707, 708, 709 and identifies the respective similarity scores for each comparison, for example, S11=0.1, S12=0.2, S13=0.3, S14=0.4, S15=0.5 and S16=0.6. In this case, a lower similarity score indicates a closer match between test face 702 and one of the training faces 703, 704, 705, 707, 708 and 709. A closer match between a test face and a training face may be indicated by a lower or higher similarity score when compared to other similarity scores, depending on the similarity metric used.

Figure 7B:
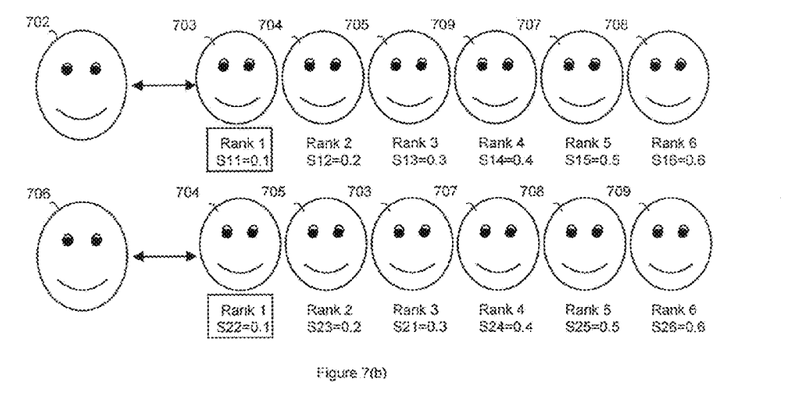
FIG. 7(b) illustrates an exemplary diagram of deriving a data set of highest ranked similarity scores for threshold training, according to one embodiment.

Referring to FIG. 7(b), the similarity scores of each of the training faces 703, 704, 705, 707, 708, and 709 against test face 702 are ranked. The highest rank (rank 1) between test face 702 and training face 703 indicates that training face 703 is most similar to test face 702. Therefore rank 1 with a similarity score of S11=0.1 provides one data point for a distribution of genuine matches (or true accept) since test face 702 and training face 703 are both of Person X. The system retrieves another test face 706 from the test set 711 belonging to Person Y. The system compares test face 706 against training faces 703, 704, 705, 707, 708, 709. The respective similarity scores are indicated by S21=0.3, S22=0.1, S23=0.2, S24=0.4, S25=0.5 and S26=0.6. In this case, test face 706 belonging to person Y has the closest match with training face 704 belonging to person X, indicated by rank 1. This means that rank 1 with a similarity score S22=0.1 between test face 706 and training face 704 represents an imposter match (or false accept) and provides a data point for another distribution of imposter matches. In this way, the system derives a data set that includes data points of highest ranked similarity scores corresponding to the number of training faces used in the comparison. This data set of data points is used for the true accept and false accept distributions.

Rather than having a single threshold, the system uses a threshold function in which the threshold is dependent on the number of tagged faces enrolled into the face database gallery. The system derives functions for the true accept and the false accept by creating multiple data points using the threshold training approach illustrated in FIGS. 7(a)-(b) by running it multiple times and varying the number of training faces per person in the training set each time.

Figure 8:
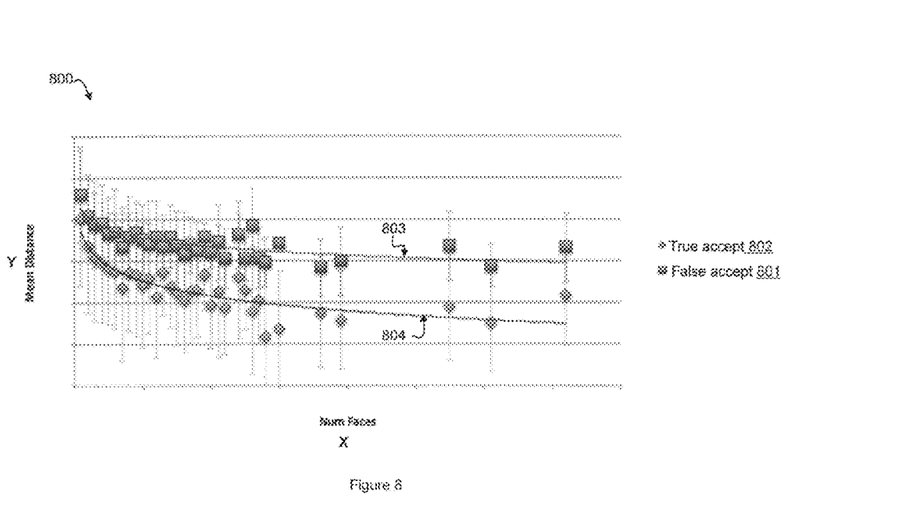
FIG. 8 illustrates an exemplary plot of similarity scores for correctly matched identities and incorrectly matched identities, according to one embodiment.

FIG. 8 illustrates an exemplary plot of similarity scores for correctly matched identities and incorrectly matched identities, according to one embodiment. The system plots the highest ranked similarity scores of imposter matches (false accepts) to derive an upper bound 801, and the highest ranked similarity scores of the genuine matches (true accepts) to derive a lower bound 802. The system calculates and plots the average and standard deviation of the similarity scores for the upper bound 801 and lower bound 802. Best-fit upper bound curve 801 curve 803 and lower bound curve and 804 conform to the upper bound 801 and lower bound 802, respectively. This approximates an envelope from which a threshold is derived by varying the parameters of curves 803 and 804. The system may vary the threshold parameters to derive a function that falls somewhere in between the envelope and test on the test data for desired results. For instance, upper bound curve 803 and lower bound curve 804 may be represented by the respective:

$$Y_{upper} = -a1 \ln(X) + b1$$

$$Y_{lower} = -a2 \ln(X) + b2$$

where a1, a2, b1 and b2 are threshold parameters, $Y_{upper}$ is the mean distance (similarity score) of the upper bound curve 803, $Y_{lower}$ is the mean distance (similarity score) of the lower bound curve 804 and X is the number of training faces used in the comparison. The threshold function is an average in the envelope in between curves 803 and 804, that is:

$$Y = -(a1+a2)/2 \ln(X) + (b1+b2)/2$$

Figure 9:
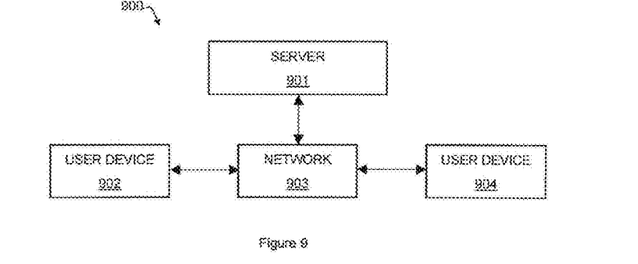
FIG. 9 illustrates an exemplary system level architecture for use with the present system, according to one embodiment.

FIG. 9 illustrates an exemplary system level architecture for use with the present system, according to one embodiment. Users of user devices 802 and 804 view a webpage hosted by a server 801 using their browsers. Server 801 includes image processing of the present system by scanning images uploaded online with reference to existing tagged images of the users using face recognition. Server 801 notifies the users on a webpage of the server 801 via their user devices 802 if their faces are recognized in the uploaded media.

Figure 10:
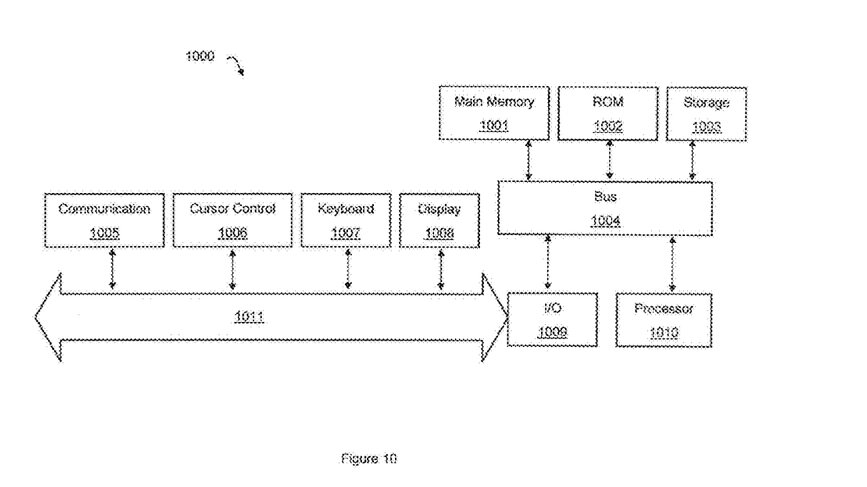
FIG. 10 illustrates an exemplary computer architecture that may be used for the present system, according to one embodiment.

FIG. 10 illustrates an exemplary computer architecture that may be used for the present system, according to one embodiment. The exemplary computer architecture may be used for implementing one or more components described in the present disclosure including, but not limited to, the present system. One embodiment of architecture 1000 comprises a system bus 1004 for communicating information, and a processor 1010 coupled to bus 1004 for processing information. Architecture 1000 further comprises a random access memory (RAM) 1001 (referred to herein as main memory) or other dynamic storage device 1003, coupled to bus 1004 for storing information and instructions to be executed by processor 1010. Main memory 1001 also may be used for storing temporary variables or other intermediate information during execution of instructions by processor 1010. Architecture 1000 may also include a read only memory (ROM) and/or other static storage device 1002 coupled to bus 1004 for storing static information and instructions used by processor 1010.

A data storage device 1001 such as a magnetic disk or optical disc and its corresponding drive may also be coupled to architecture 1000 for storing information and instructions. Architecture 1000 can also be coupled to a second I/O bus 1011 via an I/O interface 1009. A plurality of I/O devices may be coupled to I/O bus 1011, including a display device 1008, an input device (e.g., an alphanumeric input device 1007 and/or a cursor control device 1006).

The communication device 1005 allows for access to other computers (e.g., servers or clients) via a network. The communication device 1005 may comprise one or more modems, network interface cards, wireless network interfaces or other interface devices, such as those used for coupling to Ethernet, token ring, or other types of networks.

The present system ensures that the permission/privacy settings of social network sites are observed and followed, so that the system uses only photos that the user has access to. Although further searching of private images or images from an indirect connection are technically possible, authorizations and permissions from the owners of the images or the social network may be required.

According to one embodiment, the present system allows the user, who is using more than one social network sites, to associate multiple social networking profiles with the system and use a common face database gallery of images for comparison. The accuracy of the search results depends on the number of examples of the user's face.

The present system searches publicly available images on the Internet to identify similar images, according to one embodiment. The user's permission is not required as there are no connections and tagged faces to access. The image owner's permission is also not required as the images searched are publicly available on the Internet. The present system may also perform similar searches on private images on an intranet, according to one embodiment.

According to one embodiment, the system allows users to enroll his or her own images, rather than using tagged one from social networks. However, this approach potentially allows users to abuse this service against the intended individual user privacy, by uploading images of other people to search against (e.g., online stalking). The system may mitigate abuse of the service by implementing verification through face recognition verification, manual checking or via online verification using a secret password sent to an authorized/verified email account, to ensure that the enrolled faces match the user's face.

The present system enrolls images from the Internet if they are accurately identified as belonging to the user, according to one embodiment. The present system uses face recognition against existing known images of the user in combination with one or more tags. Although the present system and method describe notification and privacy management with references to faces in images in the above mentioned embodiments, other features and objects captured in images may be applied to the present system.

According to one embodiment, a group or multi-user privilege policy is provided such that a user monitors the privacy policies of more than one user account. For example, a user who is a legal guardian (e.g., a parent) may monitor the privacy for another user's account.

The above example embodiments have been described hereinabove to illustrate various embodiments for notification and privacy management of online photos and videos. Various modifications and departures from the disclosed example embodiments will occur to those having ordinary skill in the art. The subject matter that is intended to be within the scope of the invention is set forth in the following claims.

We claim:

1. A computer-implemented method for recognizing one or more objects in an image, comprising:
    applying one or more tags to a plurality of images, wherein each tag of the one or more tags is used to identify an object in the plurality of images and wherein a closest object to the tag in each image that is within a set boundary is associated with the tag;
    enrolling the tagged plurality of images into a database gallery;
    detecting a probe object in an untagged image;
    comparing a signature of the probe object with signatures of the one or more objects of the tagged plurality of images in the database gallery, wherein the signature includes a histogram; and
    deriving a similarity score for each comparison of the signature of the probe object with the signatures of the one or more tagged objects in the database gallery.

2. The computer-implemented method of claim 1, wherein an object in the plurality of images is identified based on a relationship between the object and a tag of the one or more tags, wherein the relationship is a length less than a desired limit, and wherein the length is from a first object location to a first tag location.

3. The computer-implemented method of claim 1, further comprising extracting the signatures of the one or more objects from the plurality of images, wherein the extracting of the signatures of the one or more objects of the plurality of images comprises one or more of cropping the one or more objects of the plurality of images, normalizing the one or more objects of the plurality of images, scaling the one or more objects of the plurality of images, filtering the one or more objects of the plurality of images, extracting a low level image feature from the one or more objects of the plurality of images, and comparing the low level image feature to a histogram.

4. The computer-implemented method of claim 1, further comprising extracting the signature of the probe object, wherein the extracting of the signature of the probe object comprises one or more of cropping the second feature, normalizing the second feature, scaling the second feature, filtering the probe object, extracting a low level image feature from the probe object, and comparing the low level image feature to a histogram.

5. The computer-implemented method of claim 1, wherein the signatures of the one or more objects of the plurality of images and the signature of the probe object are histograms.

6. The computer-implemented method of claim 1, further comprising providing the one or more objects of the plurality of images to a user for confirmation.

7. The computer-implemented method of claim 1, wherein the plurality of images and the untagged image come from an online album belonging to a user, an online album belonging to a connection related to the user, an internet and an intranet.

8. The computer-implemented method of claim 1, further comprising extracting the signatures of the one or more objects of the plurality of images and the signature of the probe object based on a multi-region histogram approach.

9. The computer-implemented method of claim 1, wherein comparing a signature of the probe object with signatures of the one or more objects of the tagged plurality of images in the database gallery is performed based on a similarity metric.

10. The computer-implemented method of claim 1, further comprising:
deriving a highest rank from similarity scores derived comparisons of the signature of the probe object with the signatures of the one or more tagged objects in the database gallery, wherein the highest rank represents a highest similarity score of the similarity scores.

11. The computer-implemented method of claim 1, further comprising:
deriving a plurality of true accept data points;
deriving a true accept function based on the plurality of true accept data points, wherein the plurality of true accept data points represents an identity of a test feature that is common with an identity of a training feature;
deriving a plurality of false accept data points;
deriving a false accept function based on the plurality of false accept data points, wherein the plurality of false accept data points represents the identity of the test feature that is different from the identity of a training feature; and
deriving a threshold function based on the true accept function and the false accept function.

12. The computer-implemented method of claim 11, wherein deriving a true accept data point of the plurality of true accept data points comprises:
extracting a set of training feature signatures from a set of training features, wherein identities of training features in the set of training features are known;
extracting a test feature signature from a test feature, wherein the identity of the test feature is known, and wherein the identity of the test feature is common with the identity of a training feature in the set of training features;
deriving a set of match scores by comparing the test feature signature with one or more of training feature signatures in the set of training feature signatures; and
deriving a highest rank based on ranking match scores within the set of match scores, wherein the highest rank represents a match score between the training feature signature and the test feature signature within the set of match scores.

13. The computer-implemented method of claim 11, wherein deriving a false accept data point of the plurality of false accept data points comprises:
extracting a set of training feature signatures from a set of training features, wherein identities of training features in the set of training features are known;
extracting a test feature signature from a test feature, wherein the identity of the test feature is known, and wherein the identity of the test feature is different from the identity of a training feature in the set of training features;
deriving a set of match scores by comparing the test feature signature with one or more of training feature signatures in the set of training feature signatures; and
deriving a highest rank based on ranking match scores within the set of match scores, wherein the highest rank represents a match score between the training feature signature and the test feature signature within the set of match scores.

14. The computer-implemented method of claim 11, further comprising displaying the probe image to a user.

15. The computer-implemented method of claim 14, further comprising providing the user with options to manage the probe image.

16. The computer-implemented method of claim 15, wherein the options comprise one or more of adjusting the threshold, adding a new tag to the probe object, removing the new tag from the probe object, adjusting a privacy setting of the untagged image belonging to the user, sending a message to an owner of the untagged image, saving the untagged image to an online album and sharing the online album with other users.

17. The computer-implemented method of claim 11, further comprising providing a user with options to manage the plurality of images, wherein the options comprise one or more of selecting a first image of the plurality of images, unselecting the first image and deleting the first image.

18. The computer-implemented method of claim 1, wherein the step of detecting the first face comprises,
identifying relevant faces in a first photo;
comparing each relevant face to the first tag; and
designating the relevant face closest to the first tag as the first face.

19. The computer-implemented method of claim 1, further comprising providing the second face to a user for confirmation.

20. The method of claim 1, wherein the object in the plurality of images includes a face and wherein the probe object is a probe face.

21. The method of claim 20, wherein the plurality of images are a plurality of photos and wherein the untagged image is a photo.

22. An apparatus comprising a processor configured to:
apply one or more tags to a plurality of images, wherein each tag of the one or more tags is used to identify an object in the plurality of images and wherein a closest object to the tag in each image that is within a set boundary is associated with the tag;
enroll the tagged plurality of images into a database gallery;
detect a probe object in an untagged image;
compare a signature of the probe object with signatures of the one or more objects of the tagged plurality of images in the database gallery, wherein the signature includes a histogram; and
derive a similarity score for each comparison of the signature of the probe object with the signatures of the one or more tagged objects in the database gallery.

23. The apparatus of claim 22, wherein the set boundary is a set length.

24. A system, comprising:
a user device;
a server communicably coupled to the user device to provide information to the user device, wherein the server comprises a processor configured to:
apply one or more tags to a plurality of images, wherein each tag of the one or more tags is used to identify an object in the plurality of images and wherein a closest object to the tag in each image that is within a set boundary is associated with the tag;
enroll the tagged plurality of images into a database gallery;
detect a probe object in an untagged image;

compare a signature of the probe object with signatures of the one or more objects of the tagged plurality of images in the database gallery, wherein the signature includes a histogram; and derive a similarity score for each comparison of the signature of the probe object with the signatures of the one or more tagged objects in the database gallery.

25. The system of claim 24, wherein the set boundary is a set length.

* * * * *